(12) United States Patent
Halpern

(10) Patent No.: US 7,251,501 B2
(45) Date of Patent: Jul. 31, 2007

(54) MOBILE PHONE COMMUNICATIONS SYSTEM WITH INCREASED FUNCTIONALITY

(76) Inventor: John W. Halpern, Str. Pasarani 20, Bucharest (RO) 2

(*) Notice: Subject to any disclaimer, the term of this patent is extended or adjusted under 35 U.S.C. 154(b) by 541 days.

(21) Appl. No.: 10/469,616

(22) PCT Filed: Mar. 7, 2001

(86) PCT No.: PCT/EP01/02571

§ 371 (c)(1),
(2), (4) Date: Sep. 4, 2003

(87) PCT Pub. No.: WO02/071311

PCT Pub. Date: Sep. 12, 2002

(65) Prior Publication Data

US 2004/0077372 A1   Apr. 22, 2004

(51) Int. Cl.
*H04B 1/38* (2006.01)
(52) U.S. Cl. .................... 455/558; 455/557; 455/566; 455/147; 235/380; 235/379

(58) Field of Classification Search ............... 455/558, 455/557, 566, 147; 235/380, 379
See application file for complete search history.

(56) References Cited

U.S. PATENT DOCUMENTS

| 5,497,411 | A | * | 3/1996 | Pellerin | ................ | 455/411 |
| 6,057,729 | A | * | 5/2000 | Nomura | ................ | 327/592 |
| 6,142,369 | A | * | 11/2000 | Jonstromer | ............ | 235/380 |
| 6,662,020 | B1 | * | 12/2003 | Aaro et al. | ............ | 455/552.1 |

FOREIGN PATENT DOCUMENTS

GB      2275654 A  *  9/1994

* cited by examiner

*Primary Examiner*—Matthew Anderson
*Assistant Examiner*—Minh Dao
(74) *Attorney, Agent, or Firm*—Alix, Yale & Ristas, LLP

(57) ABSTRACT

The invention relates to a mobile telephone and a smart card transaction system in combination, where the functionality of a mobile telephone is increased so that the phone can be used in a large range of transactions for which smart cards are normally used. The phone may also be provided with a slot to receive smart cards and recharge them with funds for cashless transactions, by communicating with a bank account or the like.

15 Claims, 9 Drawing Sheets

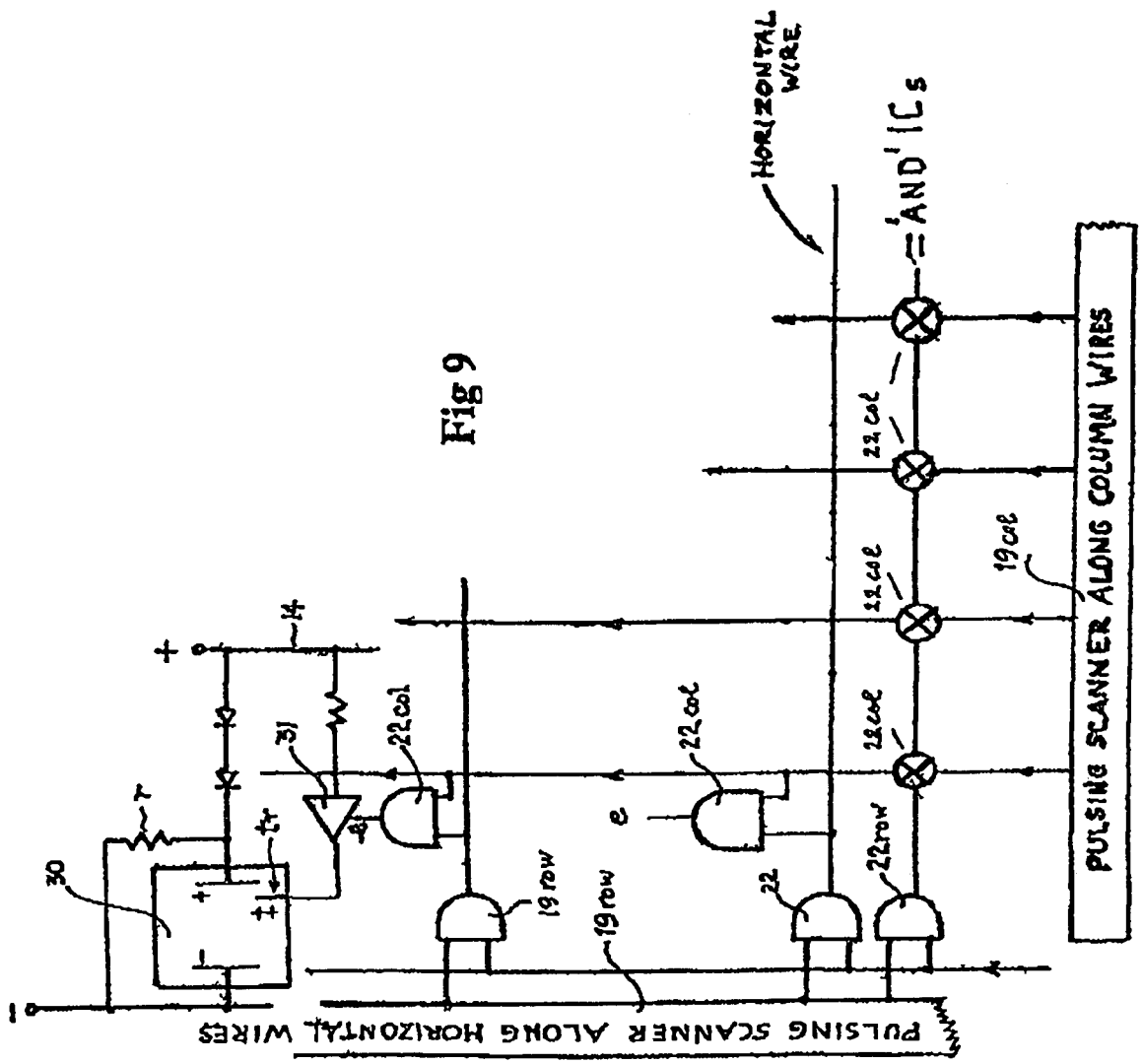

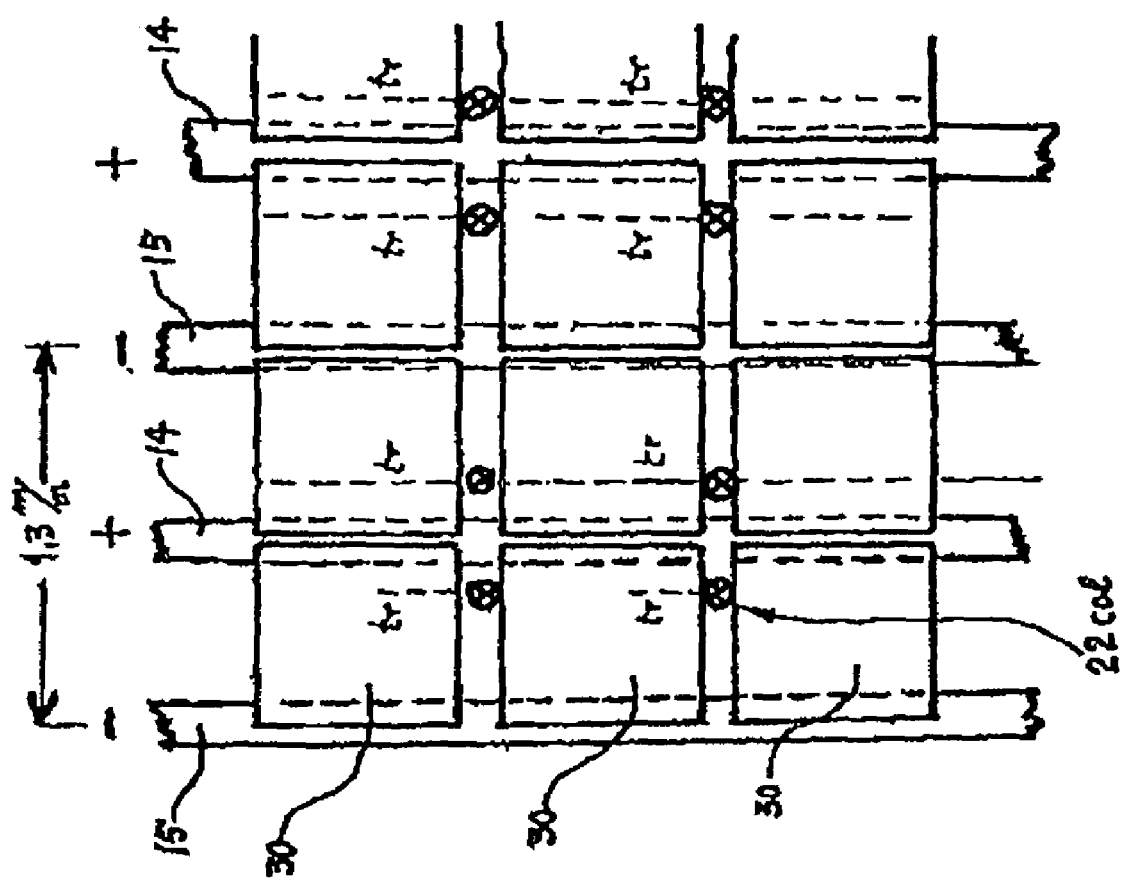

MOBILE PHONE COMMUNICATIONS SYSTEM WITH INCREASED FUNCTIONALITY

BACKGROUND OF THE INVENTION

Whereas the mobile phone market remains buoyant it may win additional patronage if the communication system and its devices could relate to the frequently arising need to interact with a smart card terminal, be it to execute a purchase or to verify a right to access a predefined service, or for some other function.

However, standard VHF antennas are almost useless to meet the condition for a transactional data transfer. It is and must remain a bilateral process. Radio antennas radiate into all directions, and can also receive from all directions.

The present invention has as an objective, the modification of a mobile telephone to increase its functionality. The modified telephone may be used in e.g. point of sale and access control transactions.

GB 2321551 discloses power transfer using a twin-loop antenna configuration capable to operate in-phase and in anti-phase. The adaptation of the principle to mobile phones makes extra demands and calls for additional inventive effort. For example, if the particulars of a travel entitlement, or of a routing instruction have to be surveyed quickly, the display area needs to be larger than that normally provided by a mobile phone device. Again, this objective must be attained without making the "pocket size data carrier" clumsy to use.

It will be seen from the description that various modes are feasible. In the foreground are concepts for dividing the device into two parts linked by a hinge or a piece of flexible material as disclosed in GB 2348521. Then, the question arises, how to convey the signals from the microprocessor to the display screen? Could some fibres of the flexible material be used as a conductor? this invention includes proposals to this effect.

SUMMARY OF THE INVENTION

In accordance with one aspect of the invention, there is provided a carrier for information and selective information exchange and communication with an external processing device; said carrier comprising two parts, the first part being substantially flat and comprising integrated electronic circuitry and data input means arranged on its surface, the second part having substantially the same dimensions as the first part and comprising display means;
- the first and second parts being hingedly connected together by a flexible insulating sheet material attached to both parts; and wherein the first and second parts are electrically connected by one or more bundles of wires embedded in said flexible insulating sheet material, said wires adapted to provide power to said display and to transmit signals from said data input means and said display.

Still another aspect is being dealt with in this description: The traveller often needs information about the locality of his immediate surroundings which cannot be provided by the Mobile Phone Service Operator. In such cases, it is anticipated, public terminals will be available for consultation. These may be at a Railway Station or in a Park, or in a street with bad lighting. Traditional LCD screens cannot be read in darkness, or dull light.

I propose a simplified solution for using tiny LED diodes as the Pixel elements from which any display is assembled. This would make the Display luminous, readable day and night. Thus, in accordance with another aspect, the invention provides an electronic display system utilising a digital communication network and based on LED display techniques, comprising diode pixels which have applied to them a bias voltage differential V1 which is below the trigger voltage $V_0$ (at which the individual pixel becomes light emitting) and wherein there is a third electrode (the trigger electrode) for each pixel connectable to the stream of serial data pulses from the said communication network which raise the voltage pulse level above $V_0$, and wherein the crystal substance of the display pixels is infused with preferably photo-sensitive impurity elements capable of releasing fresh free electrons into the space charge of the crystal matrix as soon as light emission is begins resulting in a stable lowering of the said initial threshold voltage $V_0$ to a new level V2 which, being below V1, permits the selected pixel to remain alight after the respective data pulse has gone, until such time as the applied voltage differential V1 is further lowered or altogether removed from all the pixels of the display in general.

It is also desirable to increase the functionality of a mobile phone to enable it to be used for other applications. In accordance with another aspect of the invention, the mobile phone is adapted to communicate with a smart card reader so that it can be used in transactions which can normally be carried out using a smart card.

In accordance with another aspect of the invention, the mobile phone has means for receiving a smart card, means for communicating with a financial account remote from said mobile phone; means for transferring information relating to a value of money from said account to said smart card.

In accordance with another aspect, there is provided a mobile telephone comprising a coupling loop and an oscillator circuit adapted to emit a standard frequency used in contactless cards; means for receiving messages via the telephone network; means for tuning said coupling loop; and a slot adapted to receive a smart card; the mobile telephone further comprising means for adjusting the resonance point of the combined inductance of the coupling loop and a loop in an inserted card; further comprising an oscillator source whose frequency is adaptable to the frequency of communication of smart contactless cards, said oscillator source being applied to said coupling loop in the same modulation mode as the VHF signal received by the antenna of the mobile telephone.

BRIEF DESCRIPTIONS OF THE DRAWINGS

Preferred embodiments will now be described, by way of example only, with reference to the drawings.

Figure 8:
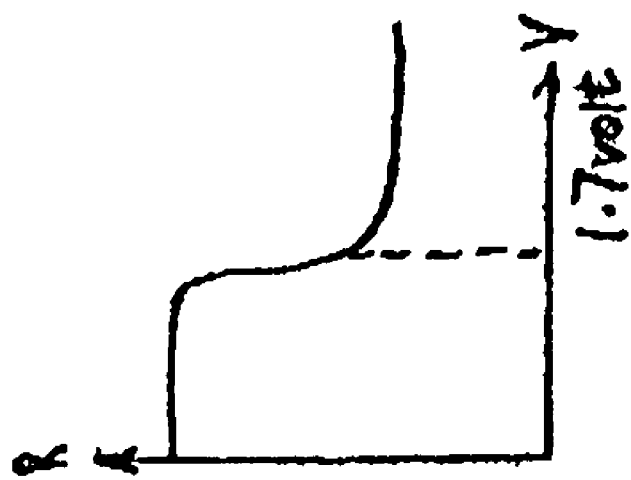
Figure 7:
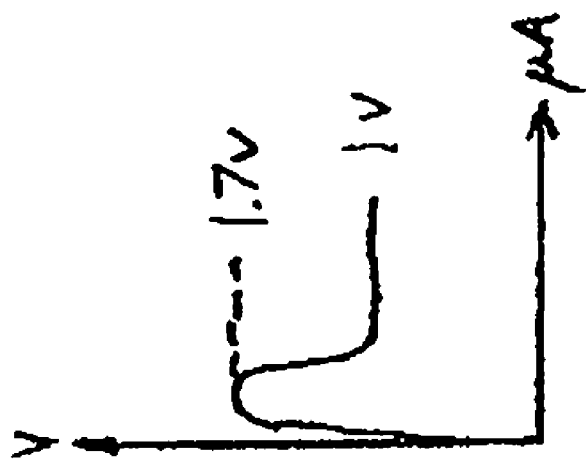
Figure 6:
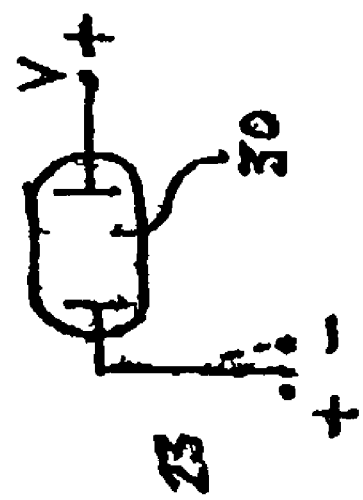

FIGS. 6, 7 and 8 explain the limitation of a conventional light emitting diode, and the changes of performance such as would be desirable for a luminous display.

FIG. 9 gives details, including a trigger electrode as used in a modified LED diode.

FIG. 10 shows a grid of tiny LED diodes each measuring only 0.65×0.65 mm.

Figure 11:
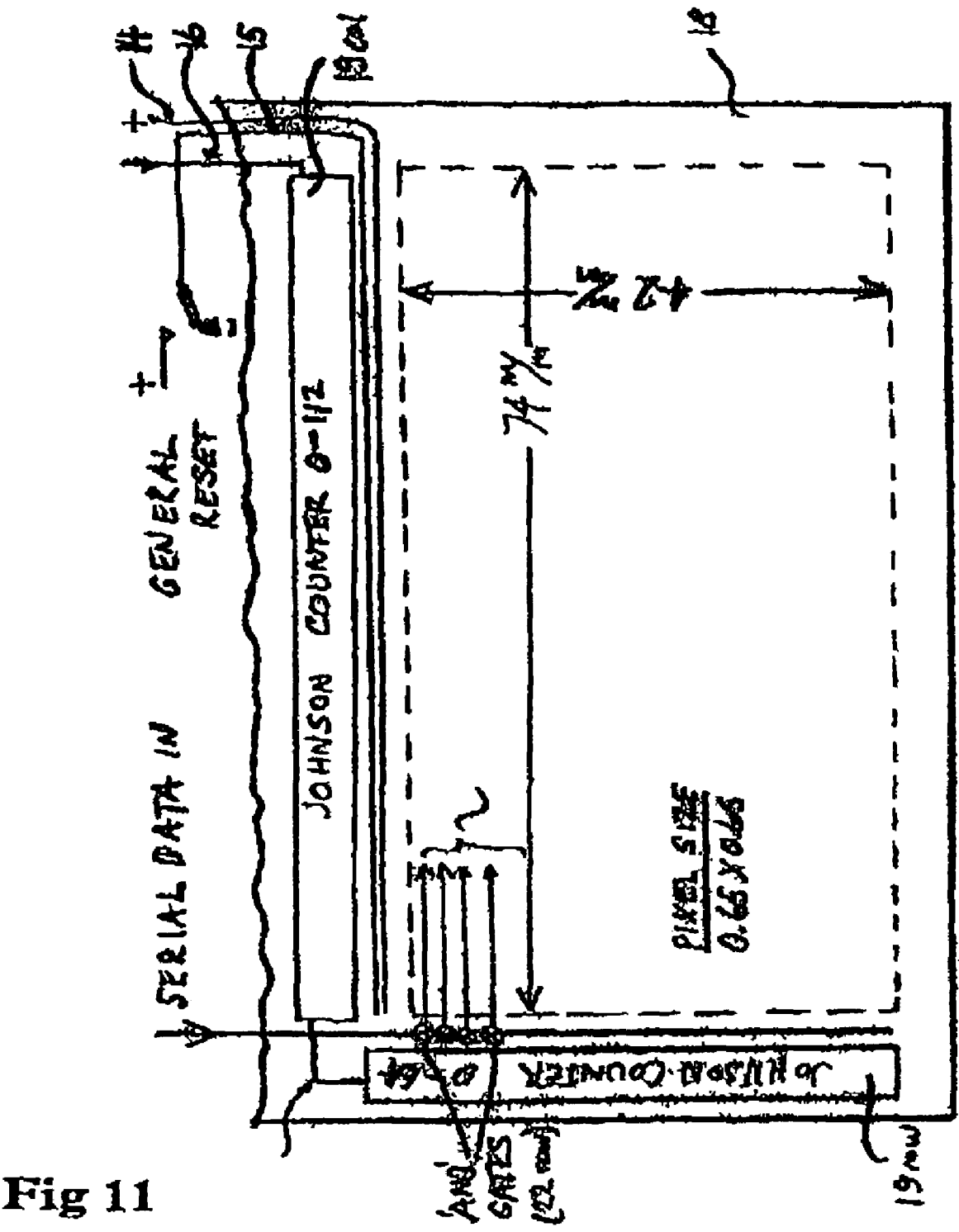

FIG. 11 provides an idea of the way in which the data are processed in order to obtain a meaningful display.

Figure 12:
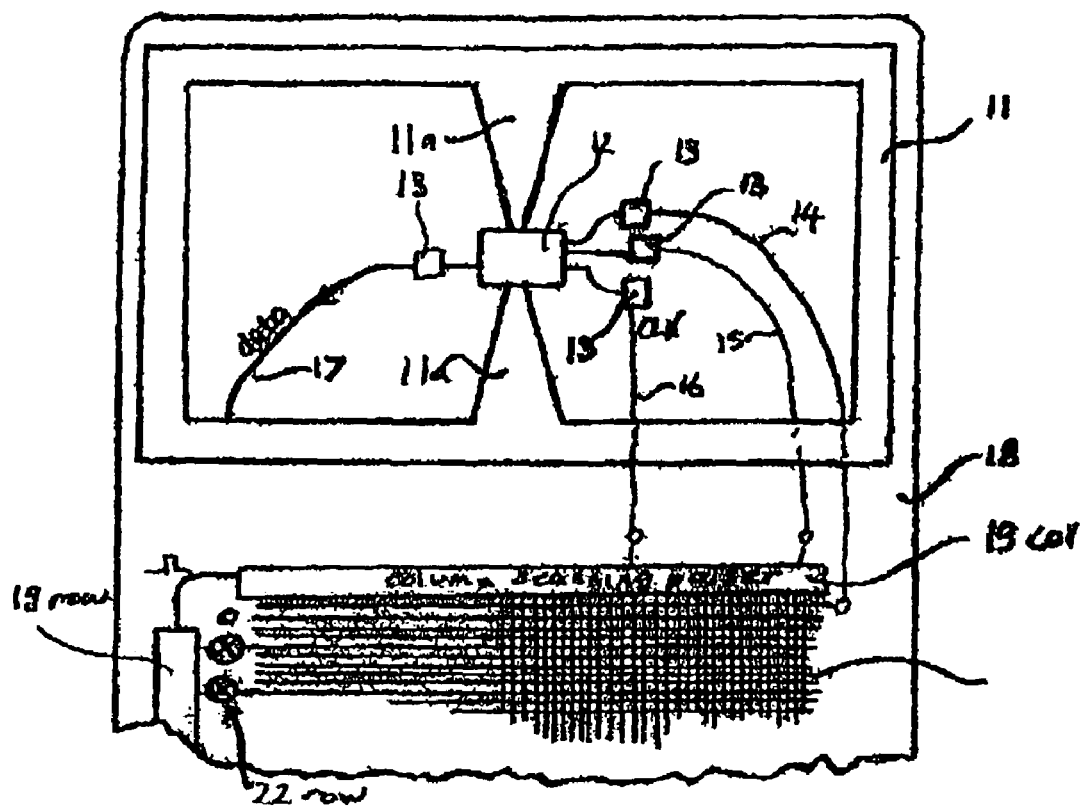

FIG. 12 shows how the dual loop antenna connects to the computer chip, and to the display drive circuits.

Figure 13:
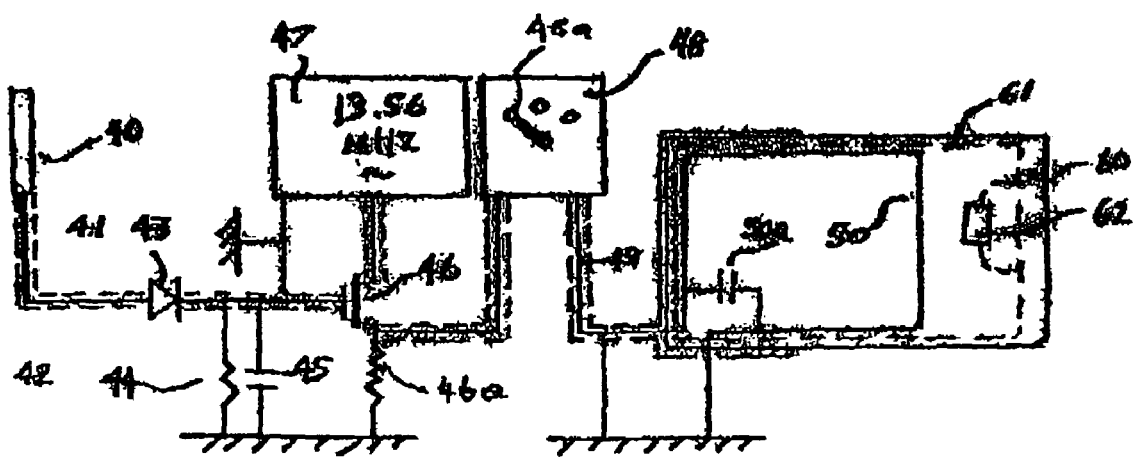
Figures 14, 15, 16:
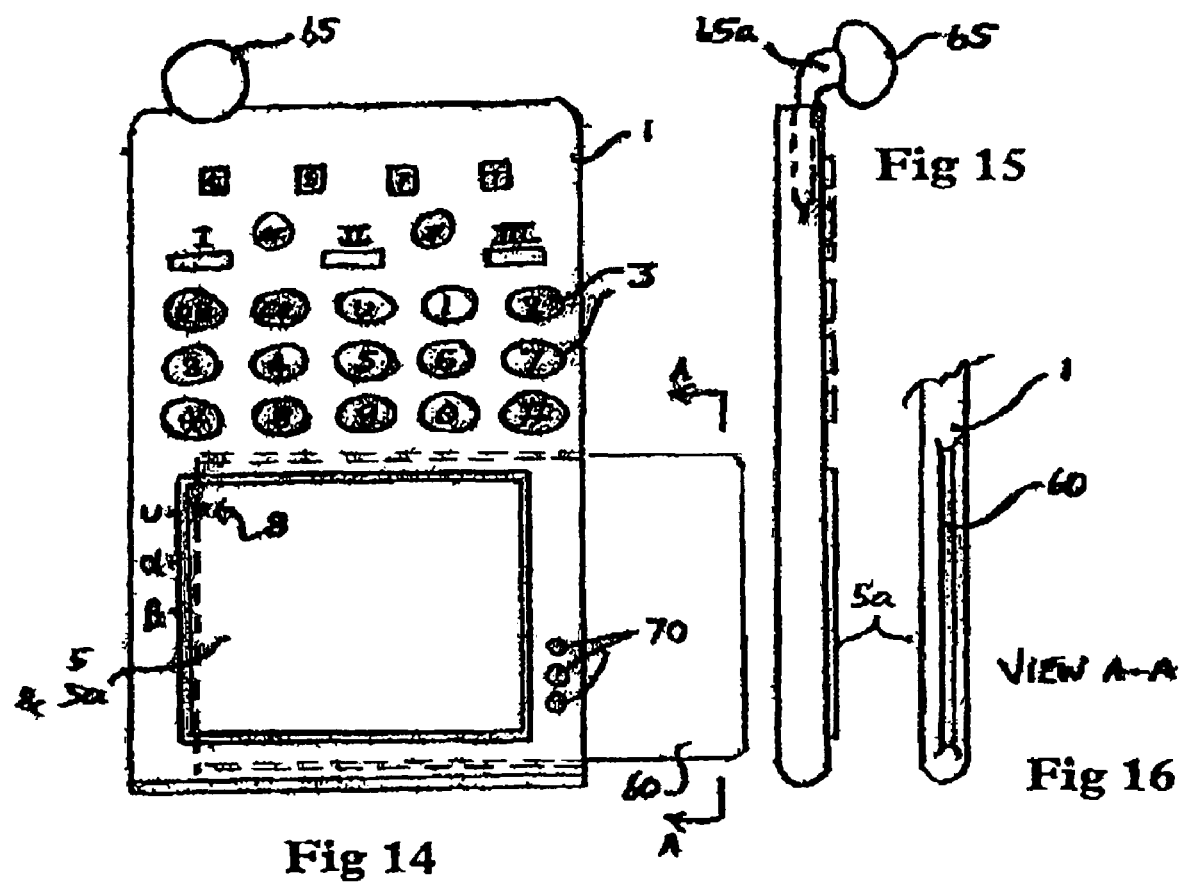

FIG. 13 shows a detail in connection with FIG. 14, namely how the data input received by a mobile phone antenna is converted into the signal form which a contactless mart card is capable of receiving during an update of the contact-leas card when placed into a slot in a mobile phone device.

FIGS. 14, 15 and 16 provide views of a proposed mobile phone such as may mainly be used for data transmission and for updating a contact-less card, but occasionally does require direct audio communication before or after text transmission.

DETAILED DESCRIPTION OF THE PREFERRED EMBODIMENTS

Figure 1:
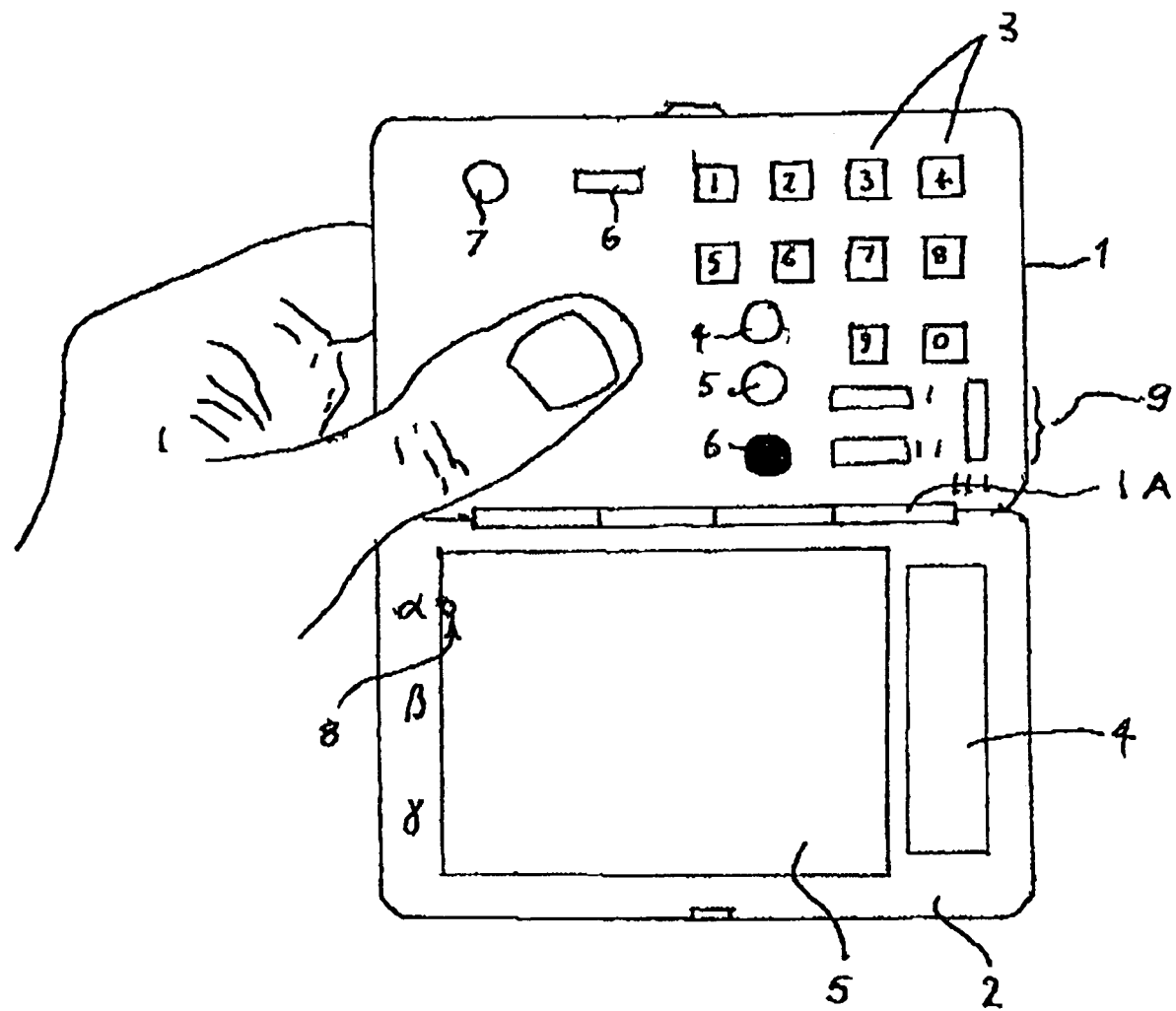
FIG. 1 shows a prior art data carrier with a keyboard to which is hinged a display window.
Figure 2:
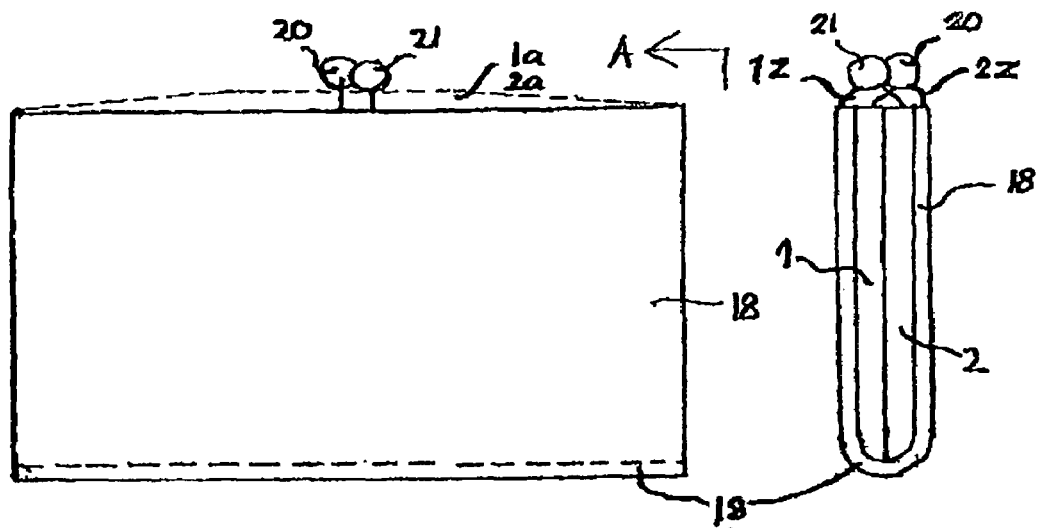
FIGS. 2 and 3 are new modifications of the device shown in FIG. 1 adapted such that the transmission of data from the micro-processor to the display electronics no longer poses a problem.
Figure 3:
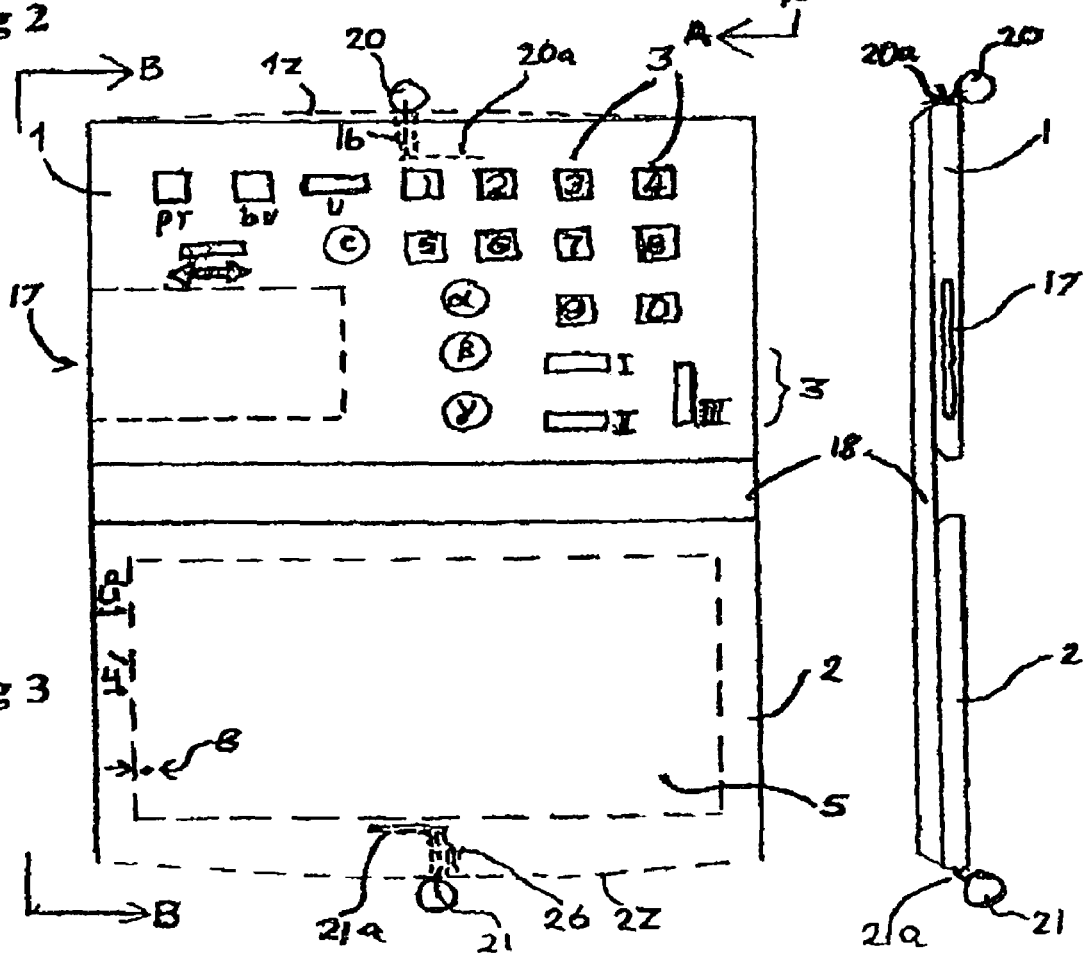

FIG. 1 is a device such as disclosed in GB 2348521, and is largely self-explanatory, providing the starting point from which FIGS. 2 and 3 were developed. FIG. 2 shows the "travel pass" in its folded condition. It should be said in passing that in this condition the data carrier can carry out purchase or access functions in transactions with a contactless terminal. There is no need to unfold the device as shown in FIG. 3, except when the details of a transaction are to be viewed.

The actual detailed execution of the electrical connections between the device memory and the display will depend to a large extent on the display technology selected and whether the display is intended for alpha-numeric readout, or has to include graphic material, as well as parts of road maps, geography of a building etc. Furthermore, it will depend on the precise nature of the contactless interface with a card reader.

One specific example will now be described with reference to FIGS. 2 and 3. The flexible connection strip extends over the full vertical dimension of parts 1 and 2, and also serves as the means for holding these two parts together, either alone or in combination with a conventional hinge as shown in FIG. 1.

FIGS. 2 and 2a represent the front and side views of the folded 'travel pass'. From the side view (seen from A—A) it is clear that the flexible cover 18 extends over the width of part 1 and of part 2. The two parts are latched in the closed position by means of spring-loaded steel balls 20, 21 although any other form of latching could be used. As shown, the metal balls 20, 21 are at the end of hardened springy wire portions 20a, 21a respectively. These are laid into recesses of the plates 1, 2 respectively, allowing them sufficient play so that the metal balls can be elastically displaced during latching. Lines 1z, 2z indicate an alternative form ouch that the metal balls are supported, preventing slippage.

FIGS. 2a and 3a are respective side views seen from A—A, and B—B respectively. The rigid portions, the keyboard part 1 and the display part 2, are covered by and bonded to a flexible quasi-fabric sheet 18 into which are embedded thin metal alloy wires. These wires connect the electronics of the two parts. THIS will be explained in conjunction with a specific example in connection with FIGS. 6 to 12. It remains to explain the functions of the keyboard buttons.—On the far upper left, there are two keys marked pr and bu. By means of these, the user may quickly enter a flag concerning any purchase he/she makes as being either private (pr) or business-related (bu). One of the programs permits the display of all the business expenses of the day, another all the private expenses of the day. Other programs allow the categorization of the expenses if a further brake down is required. In a business context, these categories will apply to all employees but may also be adapted to more individual requirements. The keys marked alpha, beta, gamma produce totals of discounts saved with three Stores named alpha, beta, gamma (see also the document WO93/02430).

A thin card-like battery 17 can be of the replaceable or re-chargeable type. Because of the use of a dual-loop antenna which is capable of receiving considerably more power than the plain radio-type antenna, it is feasible that the battery will serve as an energy buffer and equaliser, and would not require external recharging. In other words, the topping-up battery may become a permanent or semi-permanent part of the device.

There is also the possibility of mounting most, if not all of the display electronics on the flexible carrier sheet 18. This would be facilitated if this sheet consisted of several distinct layers. Flow solder jointing of pads on different surfaces can be utilized for joining the connector pads.

Turning now to FIG. 6, item 30 symbolises an LED cell or pixel such as is here proposed might be developed to produce a luminous display with a minimum of control electronics. The idea is to aim at the development of a light emitting diode which can be kept alight at a voltage considerably lower than the initial or trigger voltage. This is illustrated in FIG. 7. In terms of an inner resistance R (see/FIG. 8), it remains relatively big until the voltage reaches a trigger level. After that, the internal resistance drops considerably. To those who are experts in semiconductors, a solution for producing such a diode is likely to occur. One suggestion I have is to incorporate photo-electric components into the LED structure. After the diode's conductivity is triggered, the diode emits light, and in emitting light it would reduce its internal resistance further because of the presence of photo-electric components or atom combinations, and thus the condition of light generation would tend to become permanent at the lower voltage level. However, as and when the switch 23 substitutes the negative connection by a positive connection (FIG. 6), the diode relapses into its original state. This switch 23, therefore, when applied to all the diodes of the display, will darken the picture in preparation for the next scanning frame. If the change-over is fast enough (about 20 times a second) it would be possible to use the same technique for the generation of moving displays. The described property of the diode would thus be desirable.

Using such a diode 30 in FIG. 9, it has now a square shape with embedded electrodes + and −, and an additional small electrode tr, the trigger electrode. Normally, there is applied a voltage differential across the main diode electrodes which is too low to light the LED. The non-inverting amplifier 31 produces a floating output or rather no output at all to the trigger electrode tr, except the enable input 'e' is high. Then, the diode flares up and, because of the designed condition, remains alight. The said enable input becomes high only at the moment when the two scanning counters provide a pulse to the AND gates 19 row and 22 col, and in addition there is also a high data pulse (derived from the microprocessor driven by the antenna, or by a program register, that must be high at the very same pulse-moment. If therefore the data pulse is missing, no pulse will reach the enable point 'e', and the LED pixel concerned remains dark. For those LEDs which do receive the treble pulse simultaneously, the LED pixel will light up and remain so, until the general display-RESET switch 23 is activated. THIS can be either a manual switch or part of the general program to be displayed.

FIG. 10 is a presentation of the square diodes (LEDs) as seen about forty times enlarged on a substrate, on which there are also deposited the plus and minus rails 14 and 15 alternating and indications of the aforementioned AND gates and the trigger electrodes tr. In the opinion of the author, it should be possible to generate this relatively simple and repetitive structure on the basis of integration techniques already available, in order to produce this type of display fairly inexpensively. This would be the objective of further development work.

FIG. 11 shows the arrangements of the Johnson Scanners 9-row and 19-col once more to the left and to the top of the Display Area on a larger scale. These components are placed on the rigid substrate 2 behind which the flexible connector fabric 16 is bonded on.

FIG. 12 shows once more the dual loop antenna 11 with its two central links 11a which converge to power up the silicon chip 12, and also receives the modulated data bits. These are demodulated in the chip circuit and placed into the buffer registers in accordance with preprogrammed routines or protocols. If these data have to be displayed, they will be converted into a serial stream and applied to the individual pixels of the display area as explained, producing images or printed matter or hand-written notes.

Figure 5:
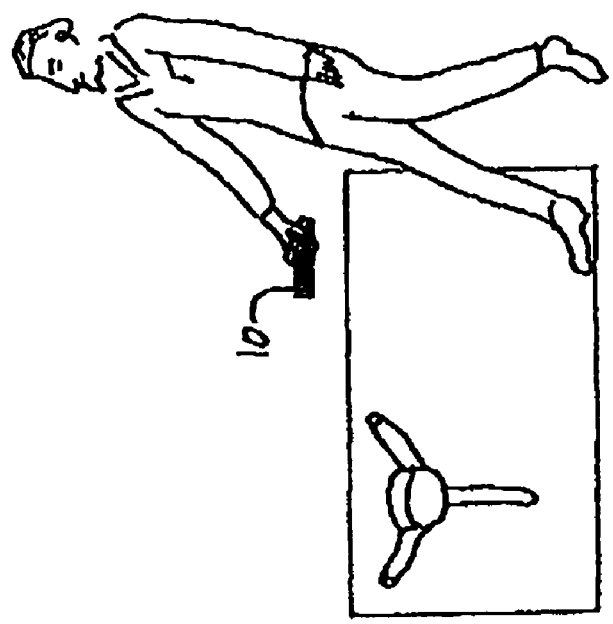
FIG. 5 illustrates an access control operation in which the usually used card is replaced by a mobile phone using the antenna configuration of FIG. 4.
Figure 4:
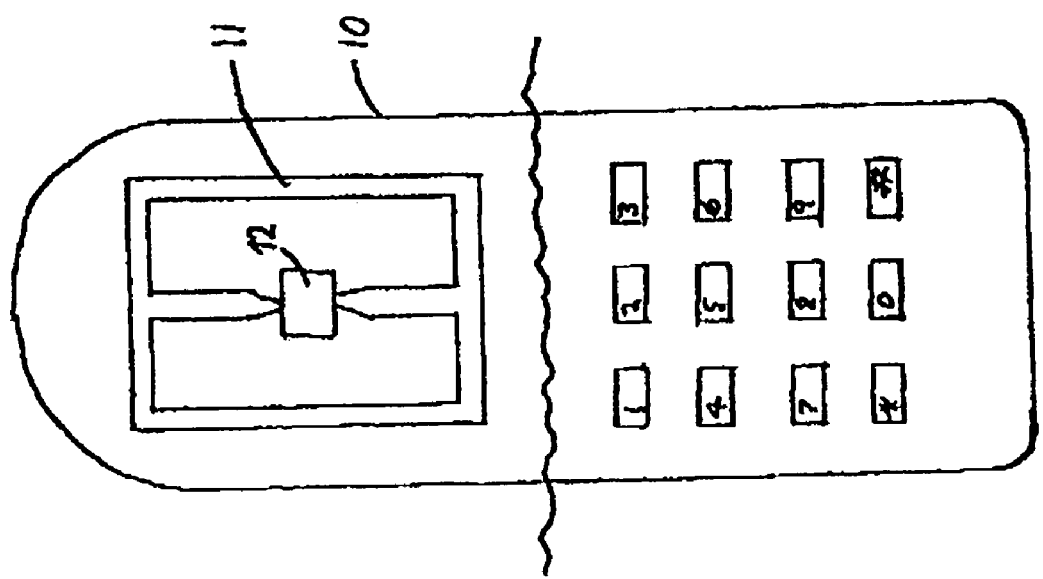
FIG. 4 illustrates the possibility of converting a standard mobile phone from strictly local data transfer events by adopting a three-branched kind of antenna, with the silicon wafer placed into the middle branch.

FIGS. 4, 5 and 13 relate to the third aspect of the invention. FIG. 13 is of special importance because it indicates the design features of another aspect of the invention which makes possible the up-dating of a contact-free smart card (such as will be used in large public transport systems) via mobile telephone. The update amount must be obtained via a bank account and be placed into a secure register of the mobile phone. THEN, a contact-free smart card 60 is placed into a slot of the mobile telephone and the process of data transfer can begin.

GB 2,291,724 discusses the potential value of the telephone network in the practical realisation of a stored value card system used e.g. for cashless paying of fares on public transport etc. The cards can be replenished or topped-up before the stored value is completely used up, via e.g. a card reader or automated cash dispenser machine.

The use of smart cards as entitlement or access permission devices is also described in UK patent application 9920616.1.

In accordance with this aspect of the present invention a mobile phone is modified to provide the capability of topping up such stored value or access control cards via the user's mobile phone, meaning that the card can be updated wherever the user happens to be.

The invention is preferably in the form of a mobile phone that fits into a shirt pocket or the like and that can double as a 'travel pass' with all the transactional and informational capabilities described in the above mentioned patent and application. This aspect of the invention also provides the mobile phone with the capability of updating a contactless card.

FIG. 13 explains how the mobile phone antenna 40 is connected to an HP diode detector 43 and, via a filter stage 44,45 to the gate of a transistor 46. The same is also connected to an oscillator 47 generating oscillations at one of the standard frequencies for contactless cards, say 13.56 Megahertz. If the amplitude modulation of the carrier wave is adequate, bursts of power representing binary data at the above ad frequency will be applied to the wire loop 50 supplementarily tuned by a capacitor 50a, so as to resonate and give maximum output. When a smart card is now placed in such a manner close to the loop 50 that the card loop 61 forms a closely coupled pair, there will be adequate transfer of energy. If there is no card present, the resonance point of the loop 50 would be at a somewhat higher frequency above the input frequency. However then the required power level would also be lower, since the card need not be powered up. In either case, the content of the digital data is displayed on the large mobile phone window 5, 5a (FIG. 14).

In FIG. 14, the mobile phone antenna bit, or respectively the dual-loop antenna as shown in FIG. 4, is not shown and should be assumed to be housed within the overall shell 1. Equally the circuitry of the signal source (47, in FIG. 13) and the modulation mode adaptor (48) with its presetting means (48a) are accommodated within the shell 1. Service personnel in the shops where that phone can be obtained would of course be instructed concerning the simple steps that are required to preset the phone to the type of card which the customer processes.

Some phones would have a slot into which the contactless credit card of the customer can be placed. Other phone versions may be made, that develop adequate power so that the card may be stuck into a little recess or simply placed on the phone for establishing the necessary close vicinity coupling loop between card and phone to transfer fresh data into the card.

The top row of buttons are marked 'c', 's', 'p' and 't'. c=cancel; s=summing operation e.g. all purchases of a list of categories that can be addressed in an upper case memory plane. In that memory, purchases of one kind will be found and the push button s will be pressed if only the sum of all purchases of that category should be displayed. Next, the button p=password, meaning a preset password is generated. This is used if required to increase confidentiality of an already encrypted data transmission. Thin is, thus, different from the PIN, which altogether enables the mobile phone to give any service whatsoever. The buttons with the left and right pointing arrows will serve to selectively delete a letter or character, and for other scrolling etc, purposes. The bar buttons marked I, II, III produce direct access to the memory record of three accounts relating to different banks or other institutions. In the upper row of five buttons in a line, DB specifies access to the debit account of one of the three accounts; CR specifies a credit account of those accounts; U shifts the reference plane of any selected button.

The large display area is covered by a relatively thick glass plate that cannot easily be scratched. This plate 5,5a would be safely held by the frame 1 and must withstand the pressure of a strong hand holding the device. It must be a high quality glass or glass and plastics combination to remain without abrasions for a long period of time.

The microphone is housed within the shell, but holes 70 permit the user's voice to be transmitted to a station attendant, conversation partner etc.

FIGS. 14 and 15 show the front and side view of the device, and more particularly clarify the use of a semi-permanent fixation of the ear-piece 65. To ensure good reception, the ear-piece in pressed into the user's ear. As FIG. 15 shows, the ear-piece 65 is held by a robust plug-in piece 65a, which fits precisely into a structural element so that it is not subject to wobbling or turning. The entire handhold device can be handled easily, so that the ear-piece fits the ear.

Finally, FIG. 16 gives a partial view of the device (view A—A) illustrating the slot 60 through which the contactless smart card 60a can be inserted. It may be important that the system prevents simultaneous entries into the memory of the mobile phone. This can be done e.g. electronically by not allowing the PIN of the card to be the same as the PIN of the mobile phone. If the PINs are identical, then no transaction may be carried out. If they are different, the update transaction can be carried out in the memory of the card or the phone. Finally, this modified phone can be used also for audio connection, for example when an officer of the customer's bank has to be spoken to. For instances like this, the ear piece 65 has been provided. Its main feature is the shaft 65a which has a precision fit in a corresponding holder in the main body 1 of the mobile phone, producing both mechanical rigidity and good electric contact for the built-in phone leads. The main specification is that the connection system must be free from wobbling movements, and, once set, there should be no movement of the ear piece insert. On the other hand, the user will find that the unaccustomed form of the ear piece will soon be accepted by the public, or at least by that part of the public who knows the value of brevity in business conversations.

From the point of view of security, the following specifications must be enforced:
(a) the PIN members for the mobile phone and for the smart card must be different ones.
(b) When the PIN of the smart card is chosen, it would be only the smart card that is updated, but not the financial section of the mobile phone.
(c) Vice versa, when the Mobile Phone PIN code is used, only the Mobile Phone receives value, and not the smart card, even when inserted into the phone.

The invention claimed is:

1. A mobile telephone comprising a coupling loop and an oscillator circuit adapted to emit a standard frequency of a carrier signal used in smart contactless cards, said telephone adapted to transmit signals to such a card, said telephone comprising:
   means for receiving messages via a telephone network; the mobile telephone further comprising means for adjusting a resonance point of a combined inductance of the coupling loop and a card coupling loop when said telephone and said card are in communicating relationship; further comprising an oscillator source whose frequency is adaptable to the frequency of the carrier signal of said smart contactless card; and
   means for translating said messages into signals using the same modulation mode as that of the card carrier signal.

2. A mobile telephone according to claim 1, further comprising a separate ear-piece adapted to be electrically attached to the audio circuitry of the telephone.

3. A mobile telephone according to claim 2, further comprising a slot adapted to receive a smart card.

4. A mobile telephone as claimed in claim 2, further comprising means for storing a plurality of modulation modes corresponding to standard card modulation modes, such that the modulation mode of the telephone can be preset to one of said standard modulation modes.

5. A mobile telephone as claimed in claim 2, further comprising security means so as to prevent valuable data conveyed from a bank to said phone being transferred simultaneously to the card and to a memory of the phone.

6. A mobile telephone according to claim 1, further comprising a slot adapted to receive a smart card.

7. A mobile telephone as claimed in claim 6, further comprising means for storing a plurality of modulation modes corresponding to standard card modulation modes, such that the modulation mode of the telephone can be preset to one of said standard modulation modes.

8. A mobile telephone as claimed in claim 6, further comprising security means so as to prevent valuable data conveyed from a bank to said phone being transferred simultaneously to the card and to a memory of the phone.

9. A mobile telephone as claimed in claim 1, further comprising means for storing a plurality of modulation modes corresponding to standard card modulation modes, such that the modulation mode of the telephone can be preset to one of said standard modulation modes.

10. A mobile telephone as claimed in claim 9, further comprising security means so as to prevent valuable data conveyed from a bank to said phone being transferred simultaneously to the card and to a memory of the phone.

11. A mobile telephone as claimed in claim 1, further comprising security means so as to prevent valuable data conveyed from a bank to said phone being transferred simultaneously to the card and to a memory of the phone.

12. A mobile telephone comprising a coupling loop and an oscillator circuit adapted to emit a standard frequency used in smart contactless cards; means for receiving messages via a telephone network; the mobile telephone further comprising means for adjusting a resonance point of a combined inductance of the coupling loop and a card coupling loop of a card in communicating relationship with the telephone, the telephone further comprising an oscillator source whose frequency is adaptable to the frequency of communication of smart contactless cards and whose modulation mode is adaptable to the specification of said card, the telephone further comprising a coupling loop tuneable to the midpoint of the combined resonance of said loop and the card antenna loop when the card is placed into its coupling condition in relation to the phone.

13. A mobile telephone according to claim 12, further comprising a slot adapted to receive a smart card.

14. A mobile telephone as claimed in claim 12, further comprising means for storing a plurality of modulation modes corresponding to standard card-modulation modes, such that the modulation mode of the telephone can be preset to one of said standard modulation modes.

15. A mobile telephone as claimed in claim 12, further comprising security means so as to prevent valuable data conveyed from a bank to said phone being transferred simultaneously to the card and to a memory of the phone.

* * * * *